Aug. 2, 1932.  C. S. EASLEY  1,869,675

SELF MOISTENING SMOOTHING IRON

Filed Nov. 15, 1928

Curran S. Easley  Inventor

By N. S. Austin  Attorney

Patented Aug. 2, 1932

1,869,675

UNITED STATES PATENT OFFICE

CURRAN S. EASLEY, OF LAGRANGE, GEORGIA, ASSIGNOR TO TRULINE, INC., OF LA-GRANGE, GEORGIA, A CORPORATION OF GEORGIA

SELF MOISTENING SMOOTHING IRON

Application filed November 15, 1928. Serial No. 319,627.

My invention relates to improvements in a self moistening smoothing iron and it more especially consists of the features pointed out in the annexed claims.

The purpose of my invention is to provide a smoothing iron which may be electrically heated or otherwise, with a moistening device; that avoids the necessity of moistening clothes, fabrics, etc., in advance of their being ironed; that eliminates a risk of the fabric being burned; that cheapens and simplifies the operation of pressing fabrics; that betters the working conditions of the operators whether the device is used for domestic or general industrial purposes; and that gives a freedom and certainty of operation which is not otherwise attainable.

With these and other ends in view, I illustrate such an instance of adaptation as will disclose the broad underlying features of my invention, without limiting myself to the specific details shown thereon and described herein.

Figures 1, 2, 3, 4:
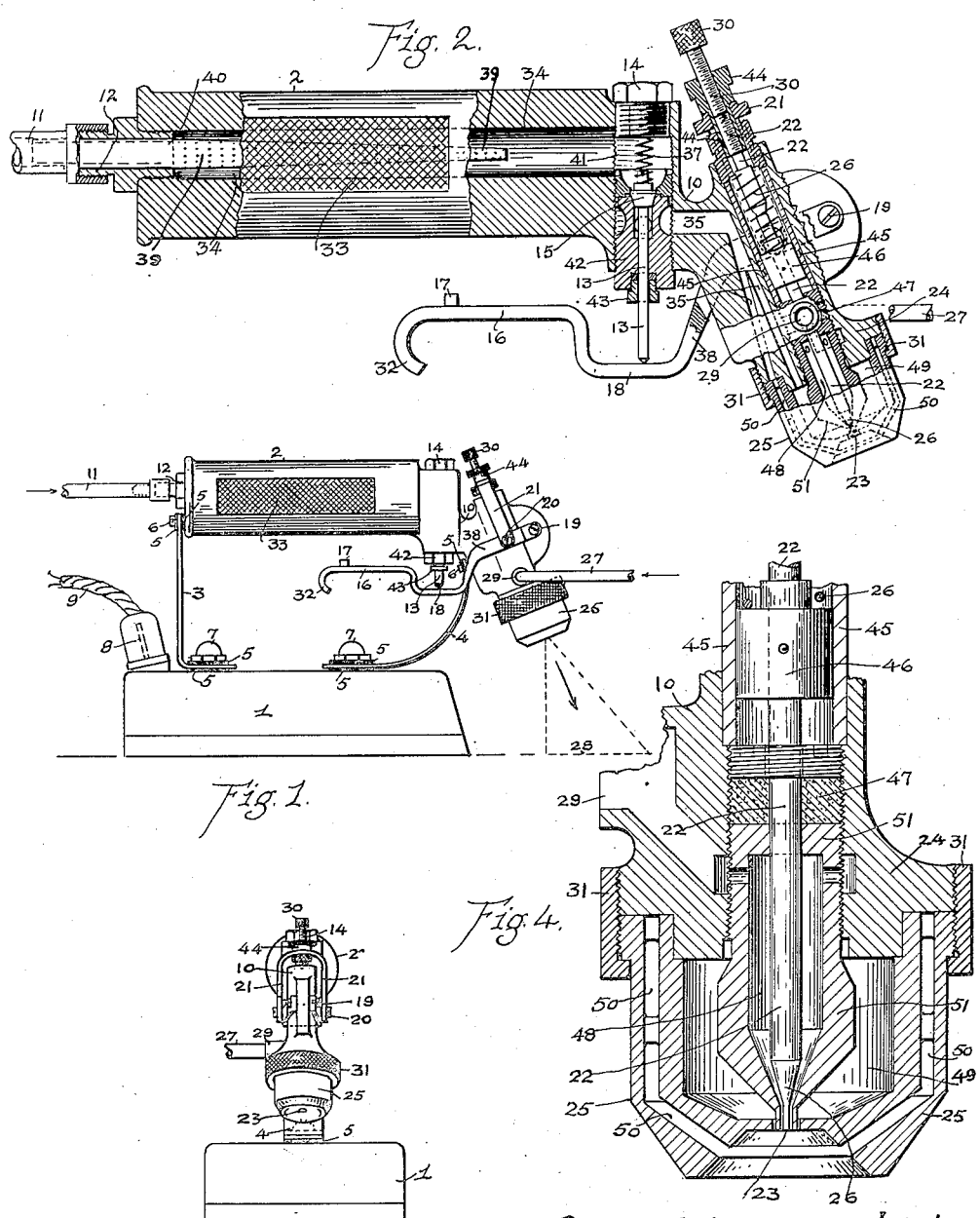
Figure 1 is a side elevation of a smoothing iron with a moistening device attached.
Fig. 2 is an elevation in section of portions of Fig. 1, showing the valve mechanisms.
Fig. 3 is a front elevation of the moistening device.
Fig. 4 is an enlarged front elevation in section of the spray nozzle showing the water valve raised.

In practically carrying out my invention I may employ any desired form of alternative mechanisms and parts of the same as the exigencies of varying working conditions may demand without departing from the broad spirit of my invention.

The smoothing iron 1 comprises the usual form of cast iron base with a heating element attached beneath it. An electric terminal 8 and flexible cord 9 serve to supply current to the heating element of the iron. For manipulating the iron a handle 2 is provided. It is positioned above the smoothing iron 1 and is attached thereto by a rear support 3 and a front support 4. The lower ends of these supports are insulated from the iron 1 by mica washers 5 and are held attached to the iron by fastening screws 7. The upper ends of the supports 3 and 4 are attached to the rear end of the handle 2 and to its front end 10 by screws 6. These supports are also insulated from the handle by mica washers 5.

The handle 2 at its front end carries the spraying or moistening device which is supplied with moisture through a water tube 27 and by compressed air through air tube 11. The admission of compressed air to the spray head is controlled by an air valve 15 and the admission of water is controlled by a water valve 26. The approximate angle of moisture delivery is shown by dotted lines in Fig. 1, and the approximate area covered by moisture is indicated by 28.

The air tube 11 is secured to the threaded terminal 12 positioned at the rear end of the handle 2. This terminal communicates with the air chamber 34 formed inside of the handle 2. Air from the chamber 34 controlled by the valve 15 reaches the spray head 24 through passages 35. It is in the spray head portion 25 at the end of the chamber 48 that the water entering opening 29 is combined with the air and both find exit past water valve 26 through a small opening 23.

The air valve stem 13 and the water valve stem 22 are both operated simultaneously by means of the curved valve lever or trigger 38. This lever is fulcrumed at 19 to the front end 10 of the handle 2. It has a short straight portion to which the water valve link or stirrup or yoke 21 is attached by screws 20. The yoke 21 at its upper end is attached to the water valve stem 22 in any adjustable manner. From the straight portion of the valve lever 38 it curves downward and at 18 engages the air valve stem 13. Extending rearward from this point the lever is bent upward to form the finger portion 16, terminating in the downwardly curving end 32. This end 32 serves to prevent the operator's finger slipping off while the lever 38 is being moved. A stop 17 limits the upward movement of the lever.

The valve stems 13 and 22 are actuated in a reverse direction from that produced by the lever 38 by springs 37 and 36 respectively or in any other manner to keep the air valve 15 and the water valve 23 closed. In order to insure that the operator's hand will not slip the handle 2 may be embossed at 33. A packing nut 43 may be used for the air valve stem 13. The spray nozzle 25 may have a knurled portion 31 so as to facilitate the removal of the nozzle when needed. A knurled head locking screw 30 may be attached to the upper end of the water head 10.

The operation of my device is exceedingly simple. The water is atomized in a well known manner whenever the lever 38 is raised, thus moistening the fabric to whatever extent is found to be desirable. This can be done while the iron is moved either forward or backward, and it may be repeated as often as necessary. The compressed air forces the water out of the exit 23 as a moisture laden vapor.

One form of internal structure is shown in Figs. 2 and 4 in which a perforated air strainer tube 39 containing any desired filtering material and of gradually reducing diameter is soldered or otherwise attached at 40 to the inside of the air hose nipple 12. This tube extends almost the full length of the handle 2 within its hollow portion 34. At the front end of the handle a vertically threaded opening 41 is formed for the air valve mechanism. This comprises a spring seating plug 14 at the upper end of the opening 41, and a valve stem seating plug 42 in the lower end. In this plug the valve stem 13 slides. The stem has an air valve 15 which is raised through a movement of the hand lever or trigger 38 as the portion 18 engages the valve stem 13. A packing gland and follower nut 43 seals off the lower end of the valve stem 13 and a spring 37 serves to normally hold the valve 15 seated when the device is not in use.

The spray head 24 is an extension of the head 10. It contains the spray nozzle 25, the water valve stem 22, water chamber 48 and the air chambers 49 and 50. An inner sleeve 45 guides the valve stem enlargement 46. Below the lower end of the sleeve a packing gland 47 and follower nut is placed, and beneath this the water nipple 51 is threaded in the same opening. This nipple has a water chamber 48 through which the water valve stem 22 passes. This chamber is connected to an external water connection 29 in any suitable and well known manner. A spring 26 abuts the guide 46 and it serves to hold the valve stem 22 and water valve 26 closed, except when through the medium of the yoke 21 and trigger 38 it is held open.

Within the nozzle 25 an inner air chamber 49 is formed to surround the water nipple 51. This chamber terminates in a flat end with a small opening 23 through it into which the reduced diameter of the nipple 51 projects so as to leave an annular passageway around the projection. The valve stem 22 has a conical end 26 which seats itself on the inside of the conical outlet of the nipple 51. The valve stem 22 terminates in a small diameter parallel projection. The actual outlet comprises parallel axial passageways which deliver the water under the air pressure to be intercepted by a separate air stream from the chamber 50, delivered at an angle to the centrally issuing air and water, the latter being controlled by the valve 26. The nozzle mechanism for atomizing the water may be such a has been described or any substitute thereof. The valve stem 22 may be adjusted by turning the stem so that its threaded upper end will stand at different positions in the adjusting nut 44. When adjusted the locking screw 30 prevents a change of the adjustment. Air is led in to chambers 49 and 50 by passages 35, see Fig. 2.

It is to be understood that the air and water control mechanism may be modified as desired without departing from the broad spirit of my invention which embodies a heated smoothing iron having a moistening device for spraying moisture onto the surface over which the smoothing iron is moved, the application of the moisture being under control.

What I claim is:

1. A combined heating, moistening and smoothing iron characterized by having a heating element in the base, a handle for operatively directing the heated base over the work to be ironed, a nozzle attached to and projecting forwardly and downwardly from the front end of the handle, an air supply for the nozzle, a water inlet to the nozzle, an air valve, a water valve, and a lever adjacent the handle and connected with both valves for simultaneously controlling the flow of water and air from the nozzle.

2. A heated moistening and smoothing iron comprising a heating element in its base and a handle for operating the iron, a nozzle projecting downwardly and forwardly from the front end of the handle, the exit of the nozzle being positioned above and forward of the front end of the heated iron so as to moisten a surface of considerable are comparable to the smoothing area of the iron, an air valve positioned between the nozzle and the handle, a water valve in the nozzle, and a single lever adjacent the handle and connected with both valves for simultaneously controlling the delivery of air and water from the nozzle onto the surface that is being ironed.

3. A nozzle for a combined moistening and smoothing iron comprising a cylindrical body, having an enlargement at one end and an opening throughout its length, a conical ended valve stem slidable in the opening, a conical seat for the valve end, means for directing water to the valve seat, an inner annular wall surrounding the valve seat having a restricted parallel opening into which the parallel ended valve projects leaving a narrow annular opening for the passage of air, an outer annular wall enclosing a supplemental air chamber, said inner and outer walls terminating in an outwardly flaring conical recess into which the valve seat and the valve stem direct an annular column of water surrounded by an annular column of air of very small dimensions in cross section, means for delivering a narrow annular column of air of relatively large diameter at an angle into the recess to comingle with the water and air passing into the conical recess, and means comprising a single lever for simultaneously controlling the flow of water and air from the nozzle.

In testimony whereof I affix my signature.
CURRAN S. EASLEY.